(No Model.)
W. R. SELF.
STEAM VEHICLE.
No. 345,327. Patented July 13, 1886.
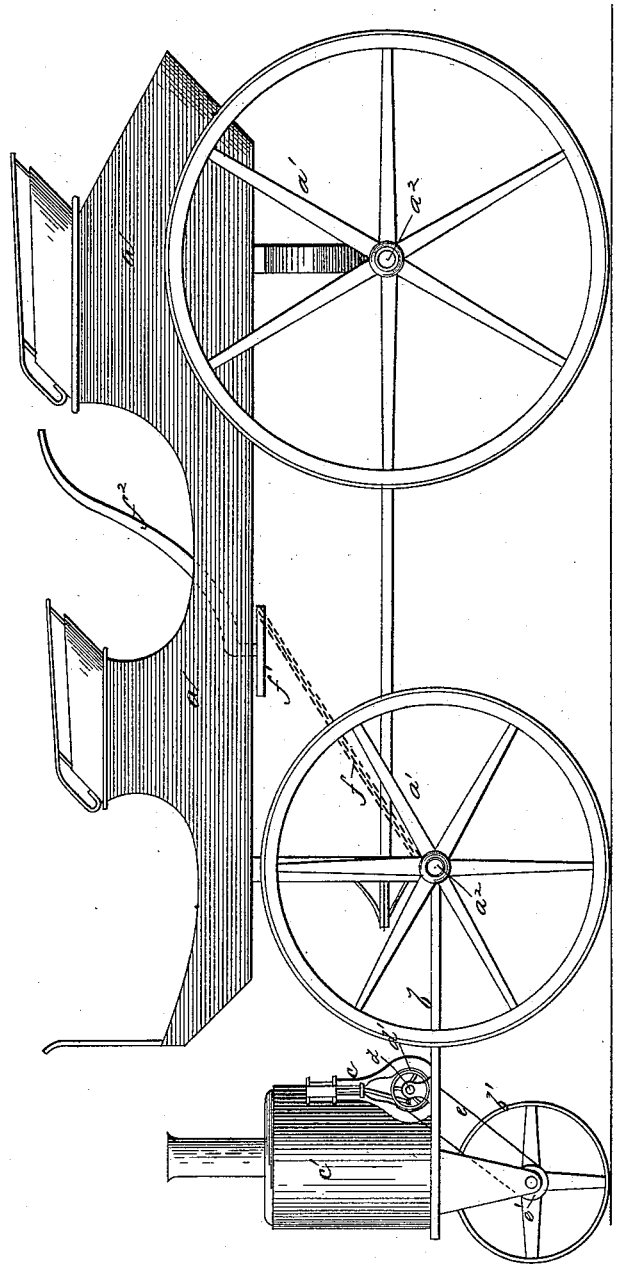

UNITED STATES PATENT OFFICE.

WILLIAM R. SELF, OF NEWTON, NORTH CAROLINA.

STEAM-VEHICLE.

SPECIFICATION forming part of Letters Patent No. 345,327, dated July 13, 1886.

Application filed September 21, 1885. Serial No. 177,659. (No model.)

*To all whom it may concern:*

Be it known that I, WILLIAM R. SELF, a citizen of the United States, residing at Newton, in the county of Catawba and State of North Carolina, have invented certain new and useful Improvements in Steam-Vehicles, of which the following is a specification, to wit:

This invention relates to an improvement in steam-vehicles; and it consists in certain peculiarities of the construction and arrangement of the same, substantially as will be hereinafter more fully set forth and claimed.

In order to enable others skilled in the art to which my invention pertains to make and use the same, I will now proceed to describe its construction and operation, referring to the accompanying drawing, in which the figure is a side elevation of a vehicle such as I design to use.

$a$ represents the bed or body of an ordinary road-vehicle of any desired shape or size, and $a'$ are the wheels on the axles $a^2$. The forward axle is provided with a table or frame, $b$, projecting in front of the vehicle, and having under its forward end a supporting and traction or drive wheel, $b'$, which rests upon the ground in a line with the center of the axle, in which position it is used to the best advantage. Upon this frame or table $b$ is secured an engine, $c$, of suitable size and form, many of which are well known, and also the boiler $c'$, though this latter may be located within the body of the vehicle if thought more convenient.

The engine is connected to the driving-wheels in any manner suitable to the purpose; but is herein represented as follows: Upon the platform is journaled a cranked shaft, $d$, to which is connected the pitman of the engine. On the shaft is a belt or chain wheel, $d$, which is by a belt or chain, $e$, connected to a similar wheel, $e'$, on the drive-wheel shaft, and by this means motion is transmitted to the vehicle. To the opposite ends of the forward axle is secured a chain, $f$, the center of which is passed around a pulley, $f'$, on the bed, and to this pulley or its spindle is secured a strong steering-lever, $f^2$, rising within easy reach of the rider, by which he may guide the vehicle in any direction.

It will be seen that the platform carrying the engines is rigidly attached to the axle, and turns with it to retain the drive-wheel always in the central line of draft, and the weight gives it proper traction, while the interior of the body is not obstructed with the machinery.

The device is readily applied to any vehicle, and is capable of propelling it over any roads, whether level or rough and hilly, at good speed.

Having thus fully described my invention, what I claim as new, and desire to secure by Letters Patent, is—

The combination, with the bed $a$, wheels $a'$, and steering chain and lever $f\ f^2$, of the platform $b$, its drive-wheel $b'$, and engine $c$, connected thereto, substantially as and for the purpose set forth.

In testimony whereof I affix my signature in presence of two witnesses.

WILLIAM R. SELF.

Witnesses:
 THOS. M. WARLICK,
 J. MACON McCORKLE.